United States Patent
Ishii et al.

(10) Patent No.: US 9,541,719 B2
(45) Date of Patent: Jan. 10, 2017

(54) PLUGGABLE OPTICAL TRANSCEIVER HAVING PULL-PULL-TAB

(71) Applicant: Sumitomo Electric Industries, Ltd., Osaka-shi (JP)

(72) Inventors: Kuniyuki Ishii, Yokohama (JP); Hiromi Kurashima, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/850,611

(22) Filed: Sep. 10, 2015

(65) Prior Publication Data

US 2016/0004022 A1    Jan. 7, 2016

Related U.S. Application Data

(63) Continuation of application No. 14/172,723, filed on Feb. 4, 2014, now Pat. No. 9,250,402.

(30) Foreign Application Priority Data

Feb. 5, 2013    (JP) .................................. 2013-020117
Dec. 20, 2013    (JP) .................................. 2013-263886

(51) Int. Cl.
    G02B 6/42      (2006.01)
(52) U.S. Cl.
    CPC ........... G02B 6/4261 (2013.01); G02B 6/4292 (2013.01)
(58) Field of Classification Search
    None
    See application file for complete search history.

(56) References Cited

U.S. PATENT DOCUMENTS

| | | | | |
|---|---|---|---|---|
| 5,037,175 | A | * | 8/1991 | Weber .................. G02B 6/3878 385/76 |
| 6,430,053 | B1 | * | 8/2002 | Peterson ............ H01R 13/6335 361/728 |
| 6,648,665 | B1 | | 11/2003 | Wu |
| 6,872,010 | B1 | * | 3/2005 | Bianchini ............ G02B 6/4246 385/53 |
| 7,059,887 | B1 | * | 6/2006 | Liu .................. H01R 13/65802 385/136 |
| 7,309,250 | B2 | | 12/2007 | Reed et al. |

(Continued)

FOREIGN PATENT DOCUMENTS

WO    WO-2011/089003 A1    7/2011

OTHER PUBLICATIONS

Notification of the First Office Action in Chinese Patent Application No. 201410045286.5, issued May 5, 2016.

*Primary Examiner* — Mike Stahl
(74) *Attorney, Agent, or Firm* — Venable LLP; Michael A. Sartori; F. Brock Riggs

(57) ABSTRACT

A pluggable optical transceiver is disclosed. The optical transceiver provides a pull-tab assembled with a body of the transceiver. The pull-tab comprises a pair of arms and a handle. The arms in an end portion thereof each provides a leg set in a guide formed in the body. Sliding the pull-tab to disengage the optical transceiver from the cage, the leg is slid within the guide to push the end portion of the arm outwardly. The handle provides in an end thereof a bar including a slope. The optical fiber pulled out from the optical connector set in the optical receptacle of the transceiver rides on the slope even when the transceiver is set in the cage by the upside-down arrangement.

4 Claims, 12 Drawing Sheets

(56) References Cited

U.S. PATENT DOCUMENTS

| | | |
|---|---|---|
| 8,545,252 B2 | 10/2013 | Wang et al. |
| 8,556,646 B2 | 10/2013 | Kappla et al. |
| 9,250,402 B2 * | 2/2016 | Ishii .................... G02B 6/4292 |
| 2003/0171016 A1 | 9/2003 | Bright et al. |
| 2003/0171022 A1 * | 9/2003 | Distad ................ G02B 6/4261 |
| | | 439/372 |
| 2005/0148223 A1 * | 7/2005 | Shirk .................. G02B 6/4246 |
| | | 439/160 |
| 2005/0208810 A1 | 9/2005 | Wimmer et al. |
| 2005/0208821 A1 | 9/2005 | Ishigami et al. |
| 2006/0121769 A1 * | 6/2006 | Hanley ................ G02B 6/4292 |
| | | 439/372 |
| 2009/0209125 A1 | 8/2009 | Bright et al. |
| 2012/0058665 A1 * | 3/2012 | Zerebilov .......... H01R 13/6335 |
| | | 439/370 |
| 2012/0148198 A1 | 6/2012 | Togami et al. |

* cited by examiner

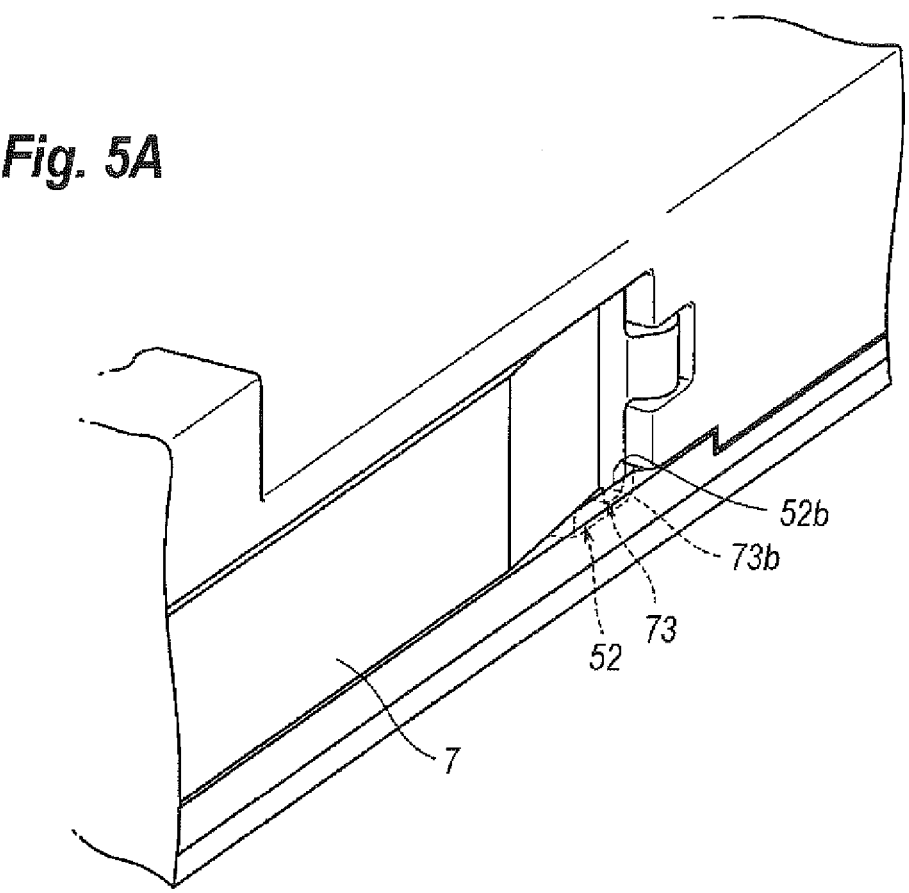
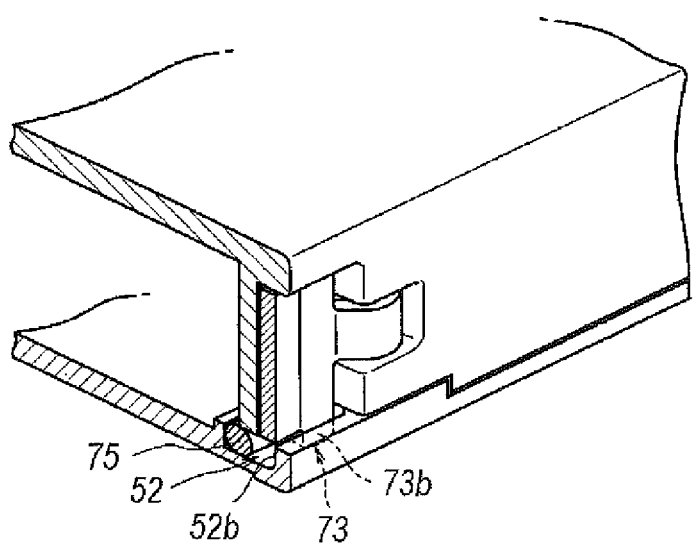

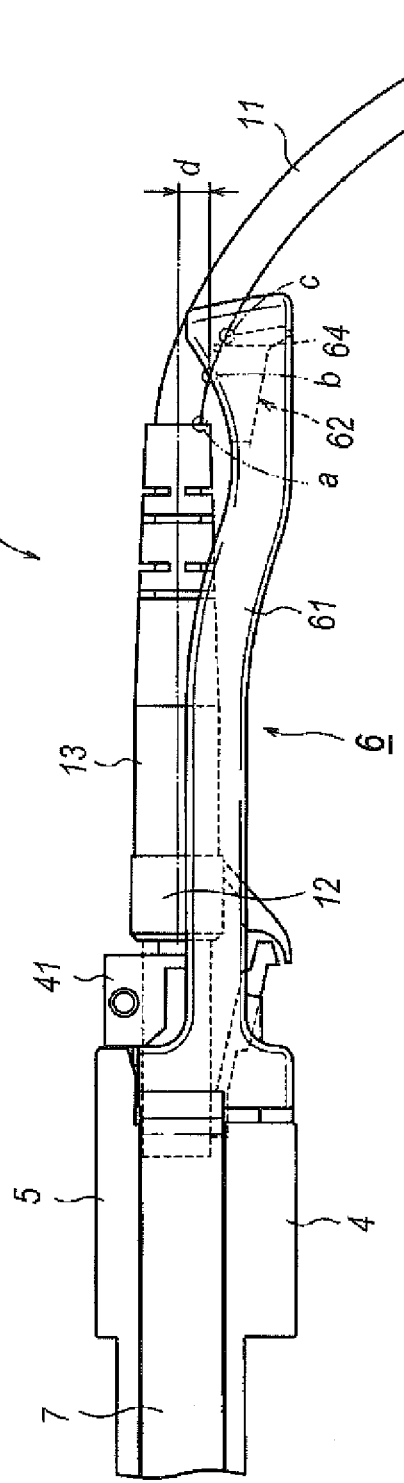
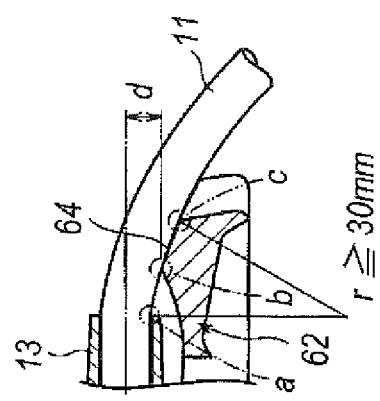
Fig. 11A
Fig. 11B

PLUGGABLE OPTICAL TRANSCEIVER HAVING PULL-PULL-TAB

CROSS REFERENCE TO RELATED APPLICATIONS

This application is a Continuation of U.S. patent application Ser. No. 14/172,723, filed Feb. 4, 2014, which claims the benefit of Japanese Patent Application Nos. 2013-020117, filed Feb. 5, 2013 and 2013-263886, filed Dec. 20, 2013.

BACKGROUND OF THE INVENTION

1. Field of the Invention

The present application relates to a pluggable optical transceiver, in particular, the application relates to an optical transceiver having a pull-pull-tab.

2. Background Arts

One type of optical transceivers has been well known as a pluggable optical transceiver that is used by being temporarily and optionally set in a cage prepared in the host system. The United States Patent Applications, such as US 20030171016A and 20120148198A, have disclosed such a pluggable optical transceiver.

FIG. 12 illustrates a pluggable optical transceiver 100 to be set in a cage 201 prepared in the host system 200. The optical transceiver 100 once set in the cage 201 is unable to extract therefrom unintentionally because a stopper 202 provided in a side of the cage 201 prevents the optical transceiver 100 from slipping out of the cage 201. When the optical transceiver 100 is to be extracted from the cage, a mechanism including a bail 101, a slider 102, and a knob 104 prepared in a side of the optical transceiver 100 releases the engagement between the optical transceiver 100 and the cage 201. Specifically, rotating the bail 101 in front of the optical receptacle 103, the slider 102 operable with the bail 101 slides frontward as pushing the knob 104 outwardly, which expands the stopper 202 of the cage to release the engagement with the optical transceiver 100. Thus, the optical transceiver 100 may be pulled out from the cage 201.

However, the slider 102 and the knob 104 of the conventional optical transceiver 100 have substantially no mechanisms to forbidden the lateral movement thereof. When the bail 101 receives a stress along the lateral direction of the optical transceiver 100, the slider 102 and the knob 104 easily stick out from a pocket provided in the side of the optical transceiver where the slider 102 and the knob 104 are ordinarily set therein. The stuck-out knob 104 has no function to expand the stopper 202 of the cage 201 outwardly; accordingly, when the optical transceiver 100 is set in the cage 201 with the stuck-out knob 104, the optical transceiver 100 becomes unable to be pulled out from the cage 201.

SUMMARY OF THE INVENTION

An aspect of the present application relates to an optical transceiver that is to be inserted in a cage prepared in a host system, where the cage provides a stopper that prevents the optical transceiver from sliding out from the cage unintentionally. The optical transceiver comprises a housing and a pull-tab. The housing encloses an optical component and an electrical component therein. Also, the housing provides a packet and a guide formed in the pocket. The pull-tab includes an arm and a handle integrally formed with the arm. Furthermore, the arm provides a knob and a leg in an end portion thereof, where the knob, working with a slide of the leg in the guide, expands the stopper provided in the cage when the pull-tab is pulled out to release the optical transceiver from the cage.

Further aspect of the present application relates to the pull-tab in the optical transceiver. The handle of the pull-tab includes a pair of extensions, each extending from the arm, and a bar connecting the extensions. A feature of the pull-tab of the present application is that the bar includes a supporting slope that supports an optical fiber extending from an optical connector set in an optical receptacle provided in the optical transceiver, when the optical transceiver is set in the cage by an upside-down arrangement.

BRIEF DESCRIPTION OF THE DRAWINGS

The foregoing and other purposes, aspects and advantages will be better understood from the following detailed description of a preferred embodiment of the invention with reference to the drawings, in which:

FIG. 5A magnifies the rear portion of the arm set in the ordinary position thereof, and FIG. 5B shows by a cross sectional view the rear leg set in the rear guide;

FIG. 11A is a side view of the optical transceiver set in the cage by the upside-down arrangement, and FIG. 11B magnifies the front end portion of the handle to receive the optical fiber.

DESCRIPTION OF EMBODIMENTS

Next, some embodiments according to the present application will be described as referring to drawings. In the description of the drawings, numerals or symbols same or similar to each other will refer to elements same or similar to each other without duplicated explanations.

Figure 1:
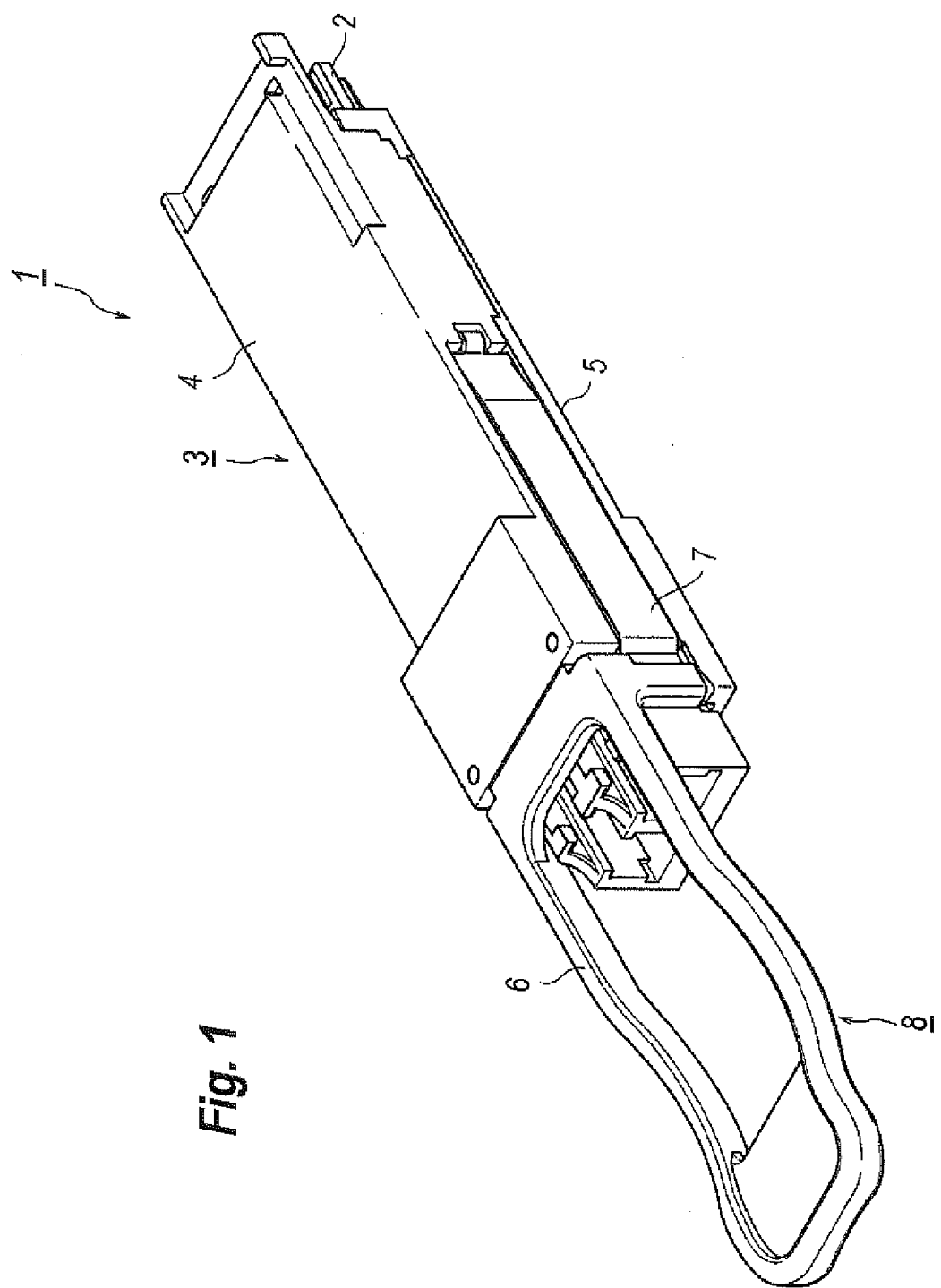
FIG. 1 is a perspective view of an optical transceiver according to an embodiment of the present application.

FIG. 1 is an outer appearance of an optical transceiver 1 of an embodiment. The optical transceiver 1 is a type of, what is called, the pluggable optical transceiver plugged in a host system without turning off the power of the host system. Accordingly, the optical transceiver is sometimes called as the type of the hot-pluggable optical transceiver. The optical transceiver 1 includes transducers to transduce signals between electrical and optical signals, and a circuit board for mounting electrical components thereon, where they are enclosed within a housing 3. The housing 3 comprises a top body 4 and a bottom body 5 providing a space where those optical and electrical components are enclosed therein. The top and bottom bodies, 4 and 5, are made of metal, preferably die-casted aluminum and die-casted zinc; but resin-made bodies are applicable to the optical transceiver 1.

The transducers, where they are not explicitly illustrated in the figures, includes a transmitter optical subassembly (TOSA) to convert an electrical signal provided from the host system into an optical signal output to an external fiber; and a receiver optical subassembly (ROSA) to convert an optical signal provided from an optical fiber into an electrical signal output to the host system. The TOSA installs a light-emitting device, typically a semiconductor laser diode (LD); while, the ROSA installs a light-receiving device, typically a photodiode (PD), where the TOSA and the ROSA, or the LD and the PD, are electrically coupled with respective electronic circuits mounted on the circuit board. One of electrical circuits drives the LD, while, the other processes the signal output from the PD. The circuit board provides an electrical plug 2 in a rear end thereof, where the electrical plug 2 is to be mated with an electrical connector prepared in the host system 200 to communicate the optical transceiver 1 with the host system 200.

The optical transceiver 1 of the present embodiment further provides a pull-tab 8 including a pair of metal arms 7 and a handle 6 made of resin and integrally formed with the arms 7. Details of the arms 7 and the handle 6 will be described later.

Figure 2:
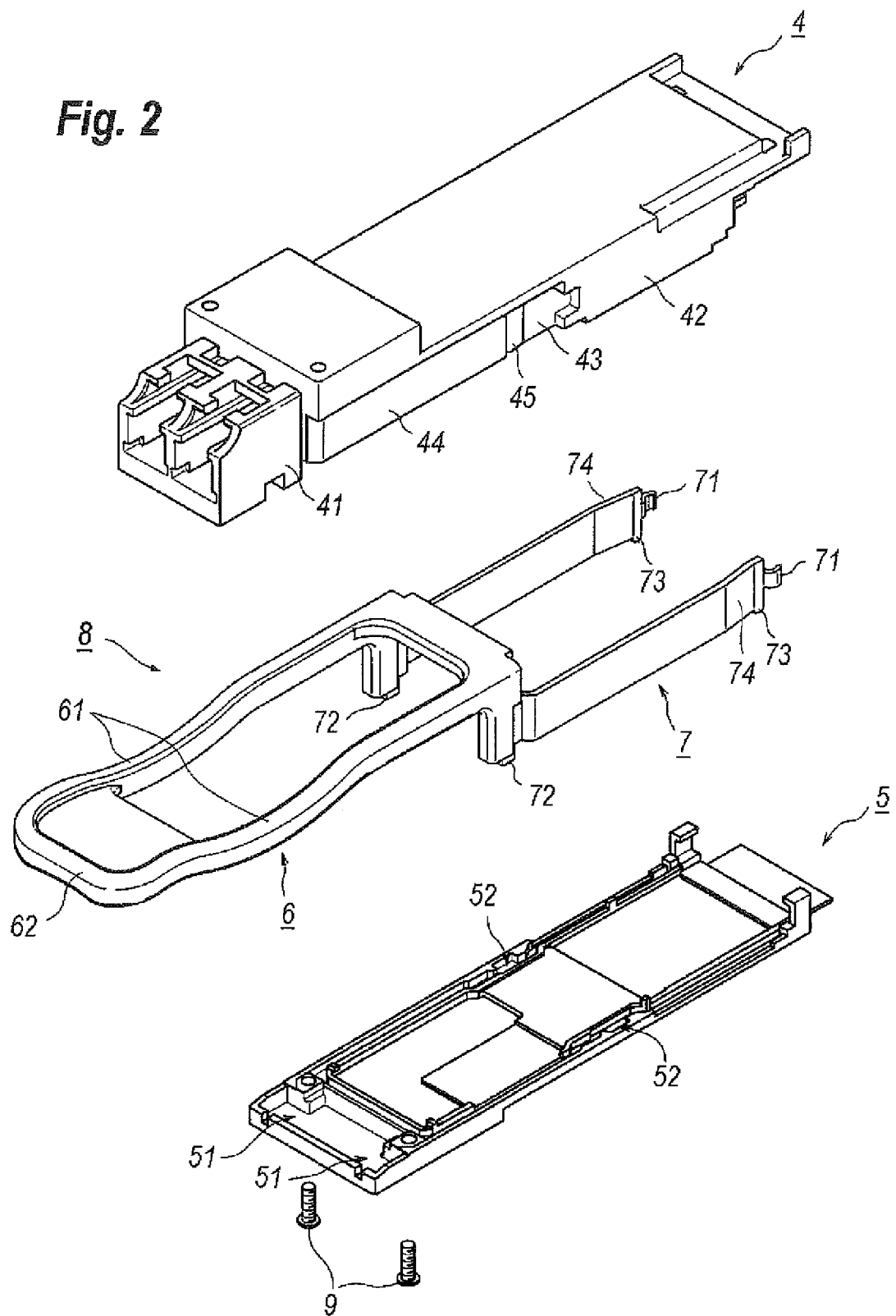
FIG. 2 is an exploded view of the optical transceiver shown in FIG. 1.

FIG. 2 is an exploded view of the optical transceiver 1, where optical and electrical components enclosed in the housing 3 are omitted. The top body 4 provides an optical receptacle 41 in the front end thereof. Directions, such as front, rear, top, and/or bottom, are used merely to explain the arrangements and do not restrict the scope of the invention. The front corresponds to a side where the optical receptacle 41 is provided; while, the rear is merely opposite to the front. The top only corresponds to a side where the top body 4 is provided, and the bottom is opposite thereto.

Mating an external connector with the optical receptacle 41, the LD and the PD in the TOSA and the ROSA, respectively, optically couple with the external fiber secured in the external connector. As shown in FIGS. 1 and 2, the optical receptacle 41 provides two ports each corresponding to the TOSA and the ROSA; thus, the optical transceiver 1 of the embodiment realizes the full duplex optical communication. The top body 4 provides sides 42 that include a pocket 43, a smooth surface 44, and a slope 45 connecting the smooth surface 44 to the pocket 43. The pocket 43 receives the stopper 202 of the cage 200 to latch the optical transceiver 1 in the cage 200 and an end portion of the arm 7; while, the smooth surface 44 faces the arm 7.

The bottom body 5 provides a front guide 51 and a rear guide 52 each receiving the front leg 72 and the rear leg 73 of the arm 7. The bottom body 5 is fastened with the top body 4 by the fitting in the rear but by the screws 9 in the front. The handle 6 is for pulling the optical transceiver 1 out from the cage 201, in particular, when the optical transceivers 1 with the configuration shown in the figures are densely installed on the host system, an optical transceiver 1 is hard to be picked in the front thereof to release from the host system. The handle 6 may facilitate the releasing of the optical transceiver 1 from the cage 201. The handle 6 provides a bar 62 to facilitate the manual picking.

The arm 7 extends from the rear end of the handle 6. A span between the arms 7 is slightly wider than a width of the handle 6, but tapered in a rear 74 thereof. Moreover, the arm 7 provides a knob 71 in the rear end thereof. The knob 71 has a U-shaped cross section as facing the bottom of the U-character outwardly. The knob 71, when the transceiver 1 is set in the cage 202, is set in the pocket 43 of the top boy 4 such that the bottom of the U-shape does not protrude from the side of the housing 3. The knob 71 pushes the stopper 202 of the cage 201 outwardly to disengage the stopper 202 with the pocket 43. Setting the legs, 72 and 73, within respective guides, 51 and 52, provided in the bottom body 5, the pull-tab 8 is assembled with the top and bottom bodies, 4 and 5.

Figure 3A:
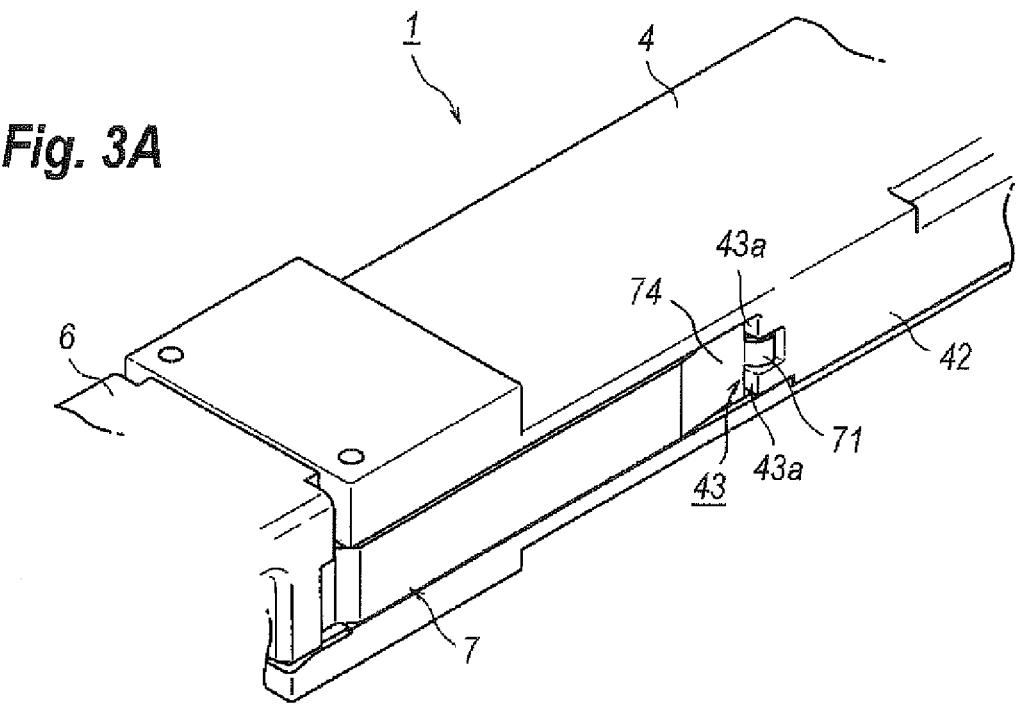
FIG. 3A shows an arm at an ordinary position in the cage.
Figure 3B:
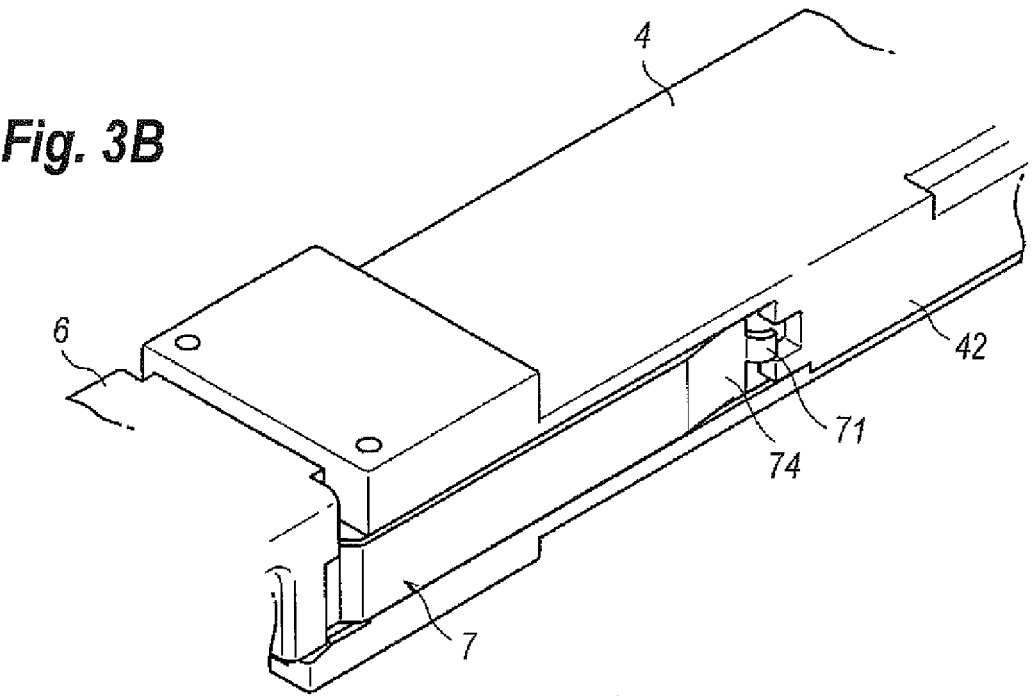
FIG. 3B shows the arm at a position to expand the tab provided in the cage to pull out the optical transceiver.
Figure 4A:
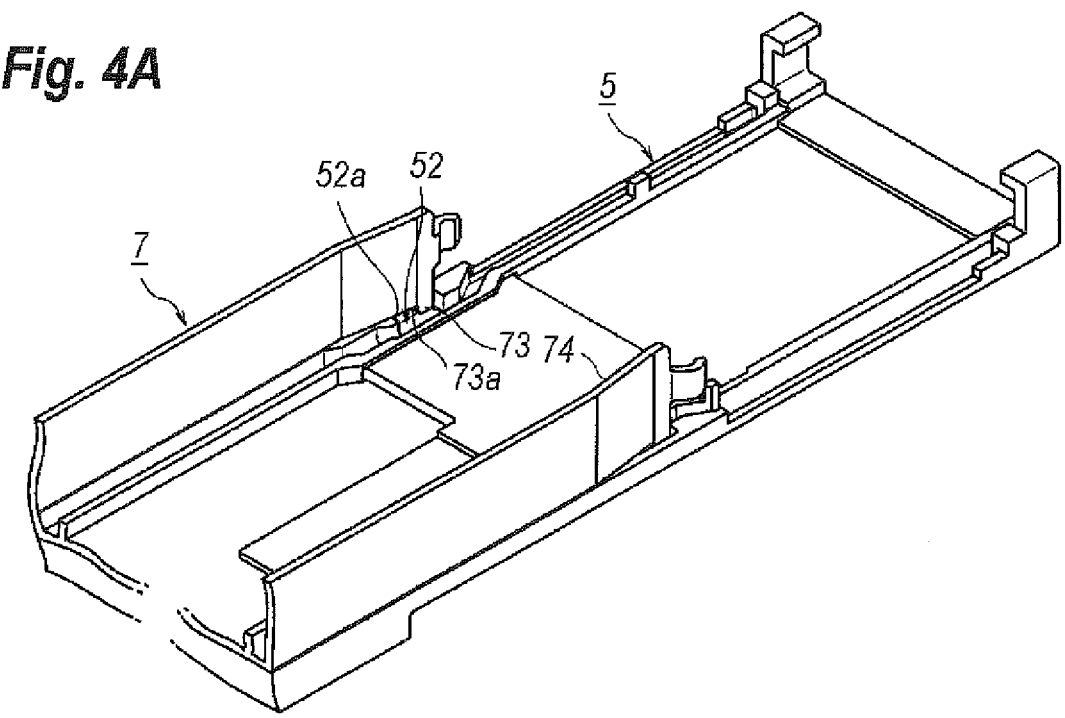
FIG. 4A shows a rear leg of the arm set in the rear guide provided in the bottom body.
Figure 4B:
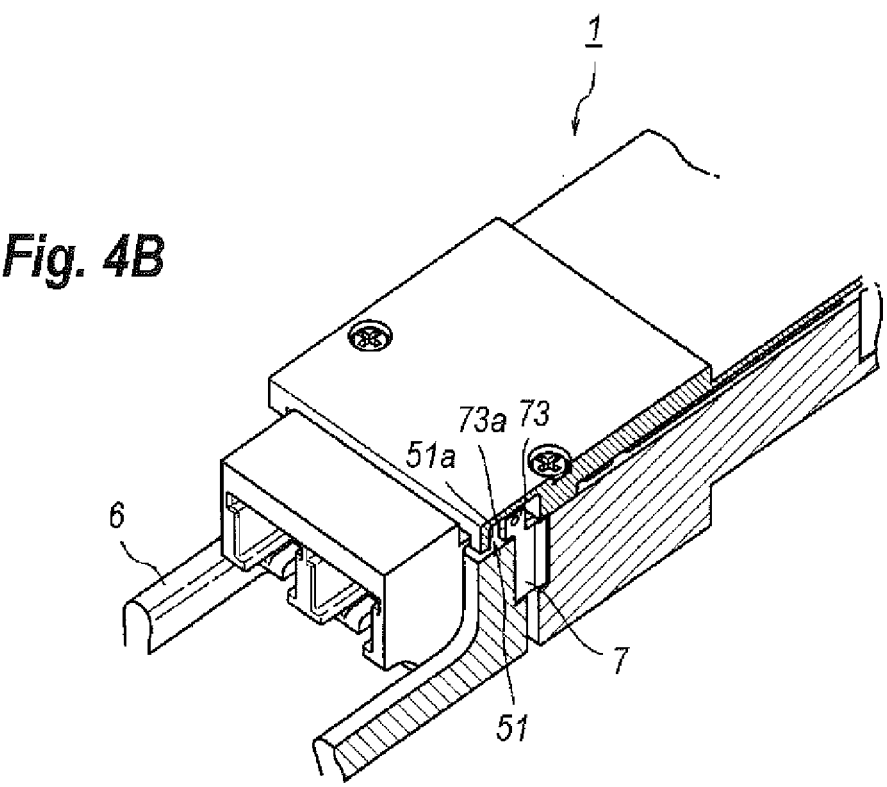
FIG. 4B shows a front leg thereof set in the front guide.
Figure 6A:
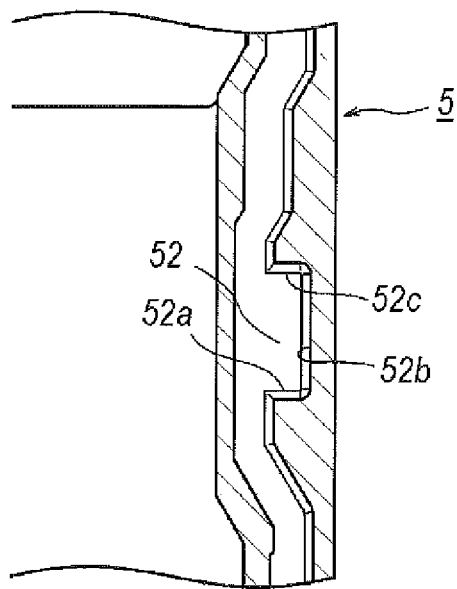
FIG. 6A is a plan view of the rear guide, and FIG. 6B schematically shows a positional relation between the rear leg and the rear guide.
Figure 6B:
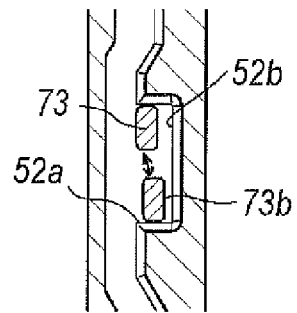

A releasing mechanism of the optical transceiver 1 from the cage 201 will be described as referring to FIGS. 3 and 4. FIG. 3A illustrates a state where the pull-tab 8, or the arm 7, is in the position where the optical transceiver 1 is set in the cage 201, namely, the stopper 202 of the cage 201 engages with the optical transceiver 1; while, FIG. 3B illustrates a state where the optical transceiver 1 is free from the stopper 202 of the cage 201. FIG. 4A omits the top body 4 from FIG. 3A, and FIG. 4B magnifies a portion of front leg 51, where FIG. 4B is a fragmentally sectional view.

When the optical transceiver 1 is set in the cage 201, that is, a state where the pull-tab 8 is not pulled to slide the arm 7 on the smooth surface 44; the knob 71 is set in the pocket 43 of the top body 4 such that the knob 71 does not protrude from the side 42 as shown in FIG. 3A. The stopper 202 of the cage 201 abuts against the rear wall 43a of the pocket 43 such that the optical transceiver 1 is not released from the cage 201.

Pulling the handle 6 forwardly, which slides the arm 7, the rear portion 74 of the arm 7 including the knob 71 slides on the slope 45 to push the rear portion 74 outwardly. Because the rear leg 73 is set in the rear guide 52, an upper side of the rear portion 74 of the arm 7 is pushed outwardly by the sliding but a lower side thereof is still set in the rear guide 52; that is, the mechanism of the rear leg 73 and the rear guide 52 causes a twisted deformation in the rear portion 74 of the arm 7, which facilitates the disengagement of the stopper 202 in the cage 201 from the rear wall 43a of the pocket 43.

Further pulling the handle 6 frontward, the rear leg 73 in the front end 73a thereof comes in contact with the front wall 52a of the rear guide 52, as shown in FIG. 4A, and the front leg 72 in the front portion 72a comes in contact with the front wall 51a of the front guide 51. In this state of the legs, 72 and 73, and the guides, 51 and 52, the knob 71 fully pushes the stopper 202 outwardly, and the optical transceiver 1 is free from the stopper 202. Still further pulling the handle 6 frontward, the optical transceiver 1 is pulled out from the cage 201. Oppositely, when the optical transceiver 1 is inserted into the cage 201, the rear end of the rear leg 73 abuts against the rear wall 52c of the rear guide 52 to push the optical transceiver 1 rearward. Thus, the front guide 51 and the rear guide 52 have a length enough for the legs, 72 and 73, to slide therein to push the stopper 202 outwardly.

In the state where the end portion 74 of the arm 7 is set within the pocket 43, the knob 71 or the end portion 74 of the arm 7 is prevented from pushing the stopper 202 of the cage 201 outwardly; because the rear leg 73 is set in the rear guide 52 and the outer side 73b of the rear leg 73 abuts against the inner side 52b of the rear guide 52, as shown in FIGS. 5A and 5B. FIG. 5A magnifies a state when the rear end portion 74 of the arm 7 is set in the pocket 43 such that the rear leg 73 is in the rear guide 52, and FIG. 5B shows the cross section of the arm 7, and the top and bottom bodies, 4 and 5. FIG. 7A is a plan view of the rear guide 52 and FIG. 7B shows a positional relation between the rear guide 52 and the rear leg 73.

The arm 7 in the rear end portion 74 thereof is prevented from extruding outwardly even when the optical receptacle 41 receives a lateral stress because the rear guide 52 prevents the rear leg 73 from expanding outward. Thus, the arm 7 in the rear end portion 74 thereof is prohibited from protruding from the housing 3 except for the operation to disengage the optical transceiver 1 from the cage 201; accordingly, the optical transceiver 1 is securely engaged with the cage 201.

Figure 7:
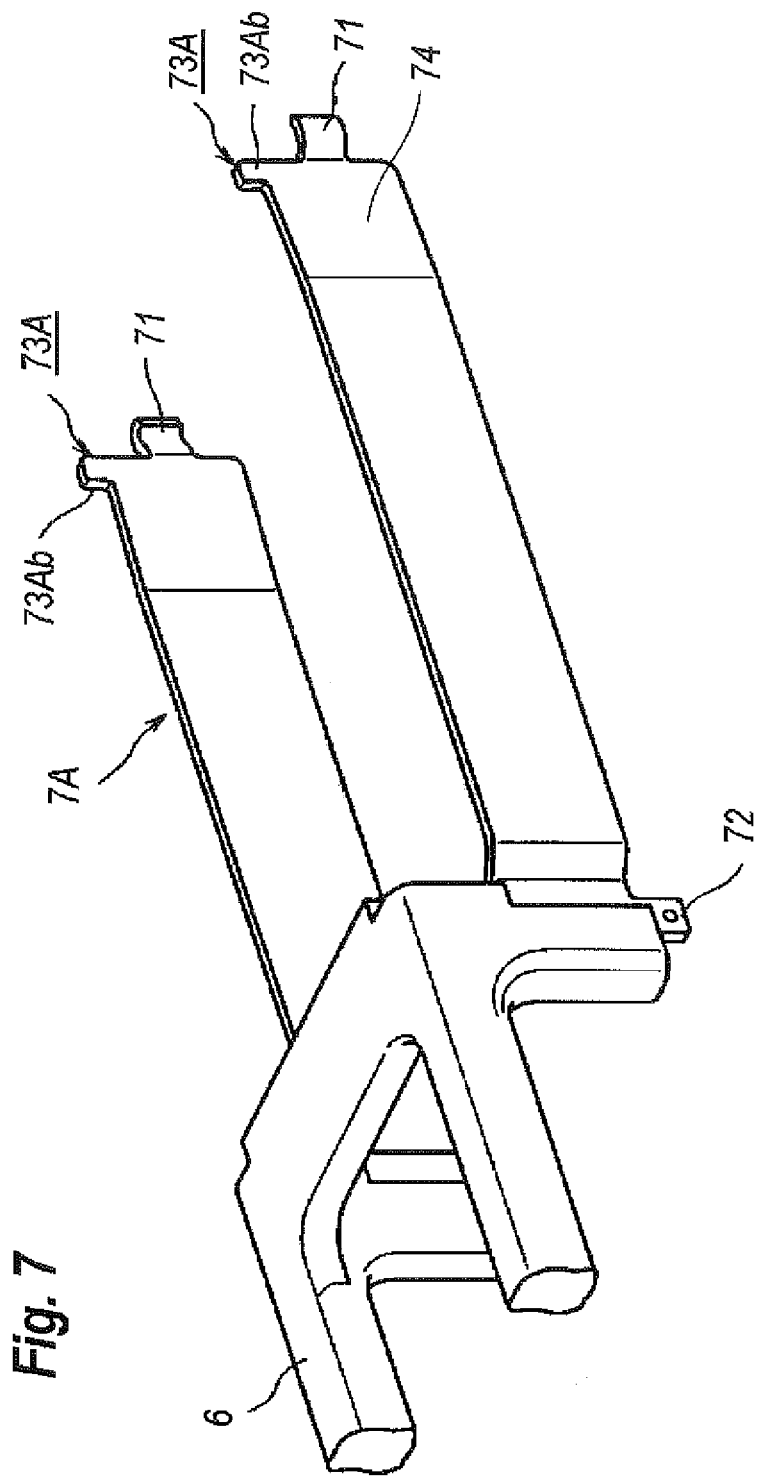
FIG. 7 is a perspective view of a modified arm.
Figure 8:
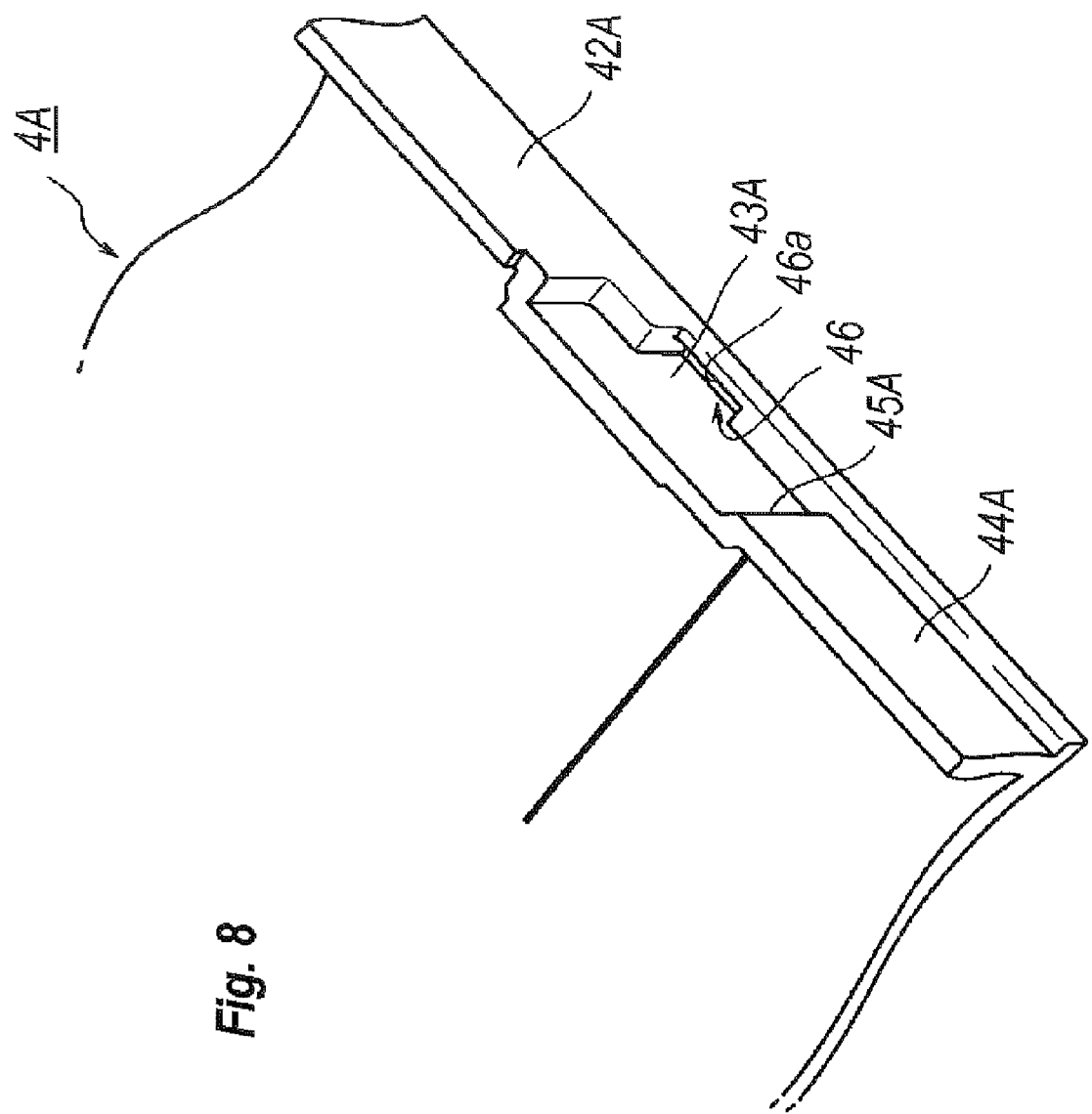
FIG. 8 shows a modified rear guide provided in the top body to receive the modified arm shown in FIG. 7.

Another embodiment of the present application will be described as referring to FIGS. 7 and 8. FIG. 7 illustrates a handle 6 accompanied with an arms 7A modified from those 7 shown in the FIGS. 1 to 6, while, FIG. 8 magnifies an inside of the top body 4B modified from the aforementioned body 4.

The modified arm 7A also provides the front leg 72 and rear leg 73A but the position thereof in the arm 7A is diagonal against the position of the front leg 72. Also, the top body 4 is modified to another top body 4A shown in FIG. 8. Specifically, the modified top body 4A provides the rear guide 46 that receives the rear leg 73A. Also, the height of the side 42A of the top body 4 is lowered, instead, that of the lower body 5 is enhanced. That is, a portion of the side 42 of the top body 4 is transferred to the bottom body 5. Concurrently with the arrangement above, the smooth surface 44A, the slope 45A, and the pocket 43A are divided into two parts, one of which is provided in the top body 4A, while, the other part is provided in the bottom body 5.

In the optical transceiver of the modified embodiment, when the rear leg 73A receives a lateral force to push the arm 7A outwardly, the outside surface 73Ab of the leg 73A abuts against the inside surface 46a of the rear guide 46 in the top body 4A, which prevents the rear leg 73A from protruding from the side of the top body 4A. The end portion 74 of the arm 7A is stably set in the side of the housing 3 except for the action to disengage the optical transceiver 1 from the cage 201.

An arrangement of the handle 6 will be further described. When the host system 200 densely mounts optical transceivers like those shown in FIG. 1 and the optical transceivers have no handles 6, the engagement/disengagement of the optical transceiver 1 with respect to the cage 201 becomes hard because the optical transceivers are unable to manipulate manually. In such a case, the handle 6 shown in the figures becomes effective. However, the bar 62 provided in the front end of the handle 6 sometimes interferes with the extension of the optical fiber 11. In particular, when the optical transceiver 1 is set in the cage by, what is called, the belly to belly arrangement or in the upside-down arrangement.

When the optical transceiver 1 is set in the cage by an ordinary arrangement, that is, the pull-tab 6 is set in the upper of the optical receptacle 41, the external fiber 11 extending from the optical connector 12 set in the optical receptacle 41 naturally droops from the end of the boot secured in the optical connector 12 by a radius of a curvature at least 30 mm without being interfered with the bar 62 of the handle 6. However, when an optical transceiver 1 is set in the cage by the upside-down arrangement, where the handle 6 of the pull-tab 8 extends from the bottom side of the optical receptacle 42, the bar 62 occasionally interferes with the extension of the external fiber. The external fiber extracted from the optical connector sometimes runs on the bar 62, and receives a stress from an edge of the bar 62. In such an arrangement, the optical fiber 11 sometimes bends at the edge of the bar 62 by a radius less than 30 mm, which is one of thresholds to compensate for the bend loss of the fiber. The pull-tab 8 according to an embodiment of the present application provides a mechanism to release the stress affecting the optical fiber 11 from the bar 62.

Figure 9:
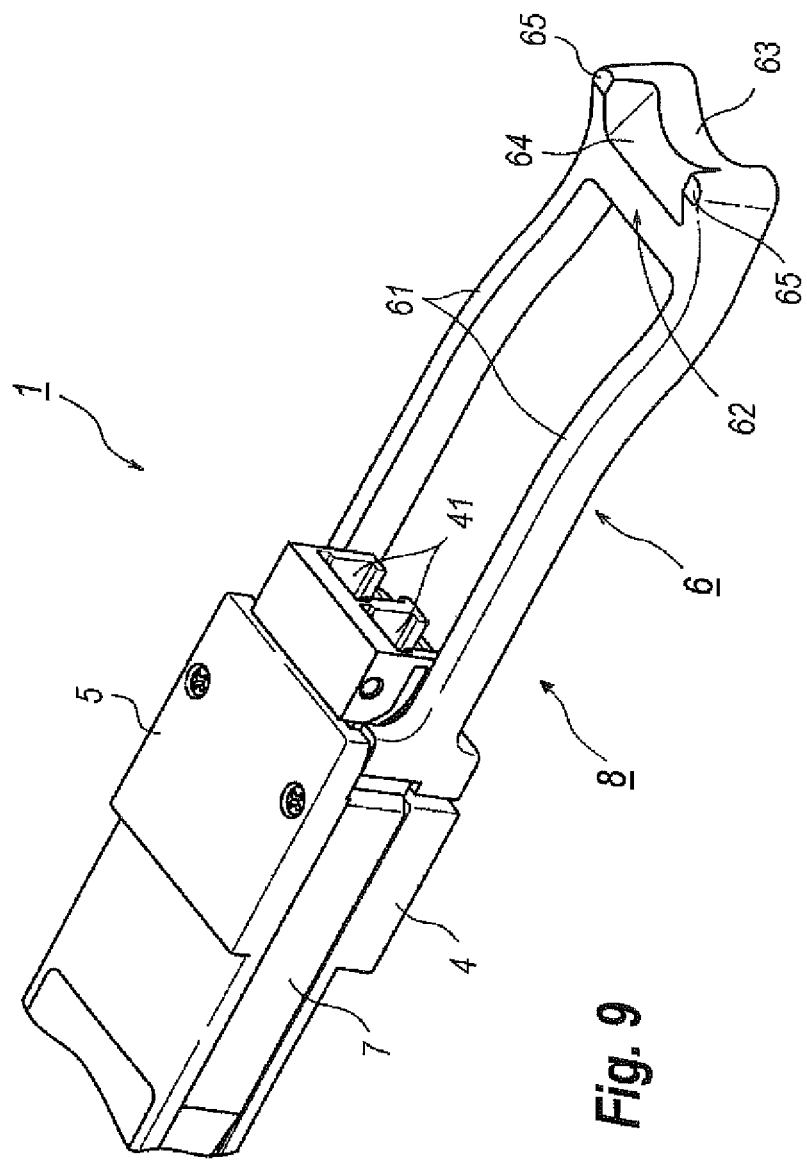
FIG. 9 is a perspective view of the handle according to an embodiment.

FIG. 9 shows a detail of the pull-tab 8 from the bottom side of the optical transceiver 1, where the optical transceiver 1 is set in the cage in the upside-down arrangement. The pull-tab 8, similar to those shown in FIGS. 1 to 7, provides the handle 6 and the arm 7. The handle 6 comprises a pair of extensions 61 extending forwardly from a portion of the optical receptacle 41, and the bar 62 connecting the extensions 61 in the front of the handle 6. The bar 62 in a front end 63 thereof is formed in an arched shape to facilitate the manipulating of the handle 6 manually at the insertion/extraction of the optical transceiver 1 with respect to the cage 201.

The bar 62 further provides a supporting surface 64 making a substantial angle with respect to the optical axis of the optical receptacle 41. The supporting surface 64 puts the optical fiber 11 extending from the optical connector thereon. Accordingly, the supporting surface 64 has a convex surface with a radius of the curvature thereof greater than 30 mm, which satisfies a standard of, for instance, ITU-TG.652 concerning the bend loss of a single mode fiber for the general purpose.

The bar 62 also provides walls 65 in both sides of the supporting surface 64 to guide the optical fiber 11. Thus, the bar 62 according to the present embodiment provides a pocket formed by two walls 65 and the supporting surface 64 to set the optical fiber 11 therein. Moreover, the supporting surface 64 has the convex surface with the predetermined radius. This arrangement of the bar 62 releases the optical fiber 11 from receiving an undesired stress even when the optical fiber 11 is drawn from the optical receptacle 42 and naturally droops downwardly. A conventional bar has a shape similar to those shown in FIG. 9, namely, combining respective extensions 61; but the supporting surface 64 is filled with a resin forming the handle 6. The fiber 11 extending from the optical receptacle 41 often rides on the bar 62, then droops downwardly, which sometimes forces the optical fiber 11 to bend at the edge of the bar 62 by a radius less than 30 mm. The optical fiber 11 of the present embodiment is released from being interfered with the bar 62; moreover, even when the optical fiber 11 rides on the bar 62, the curvature of the supporting surface 64 prevents the optical fiber 11 from being bent by a radius less than 30 mm.

Figure 10:
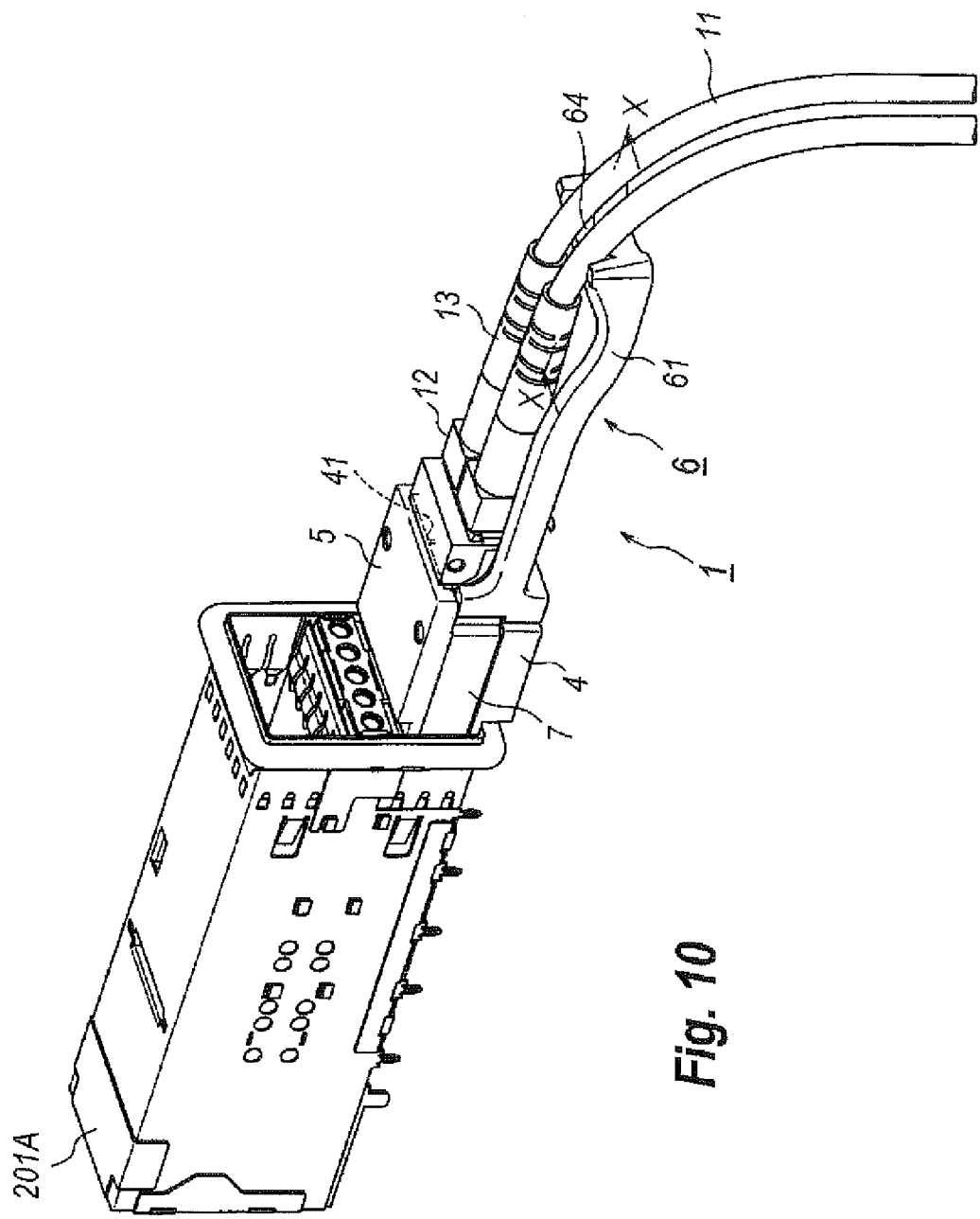
FIG. 10 shows an optical transceiver set in the cage by the upside-down arrangement.
Figure 12:
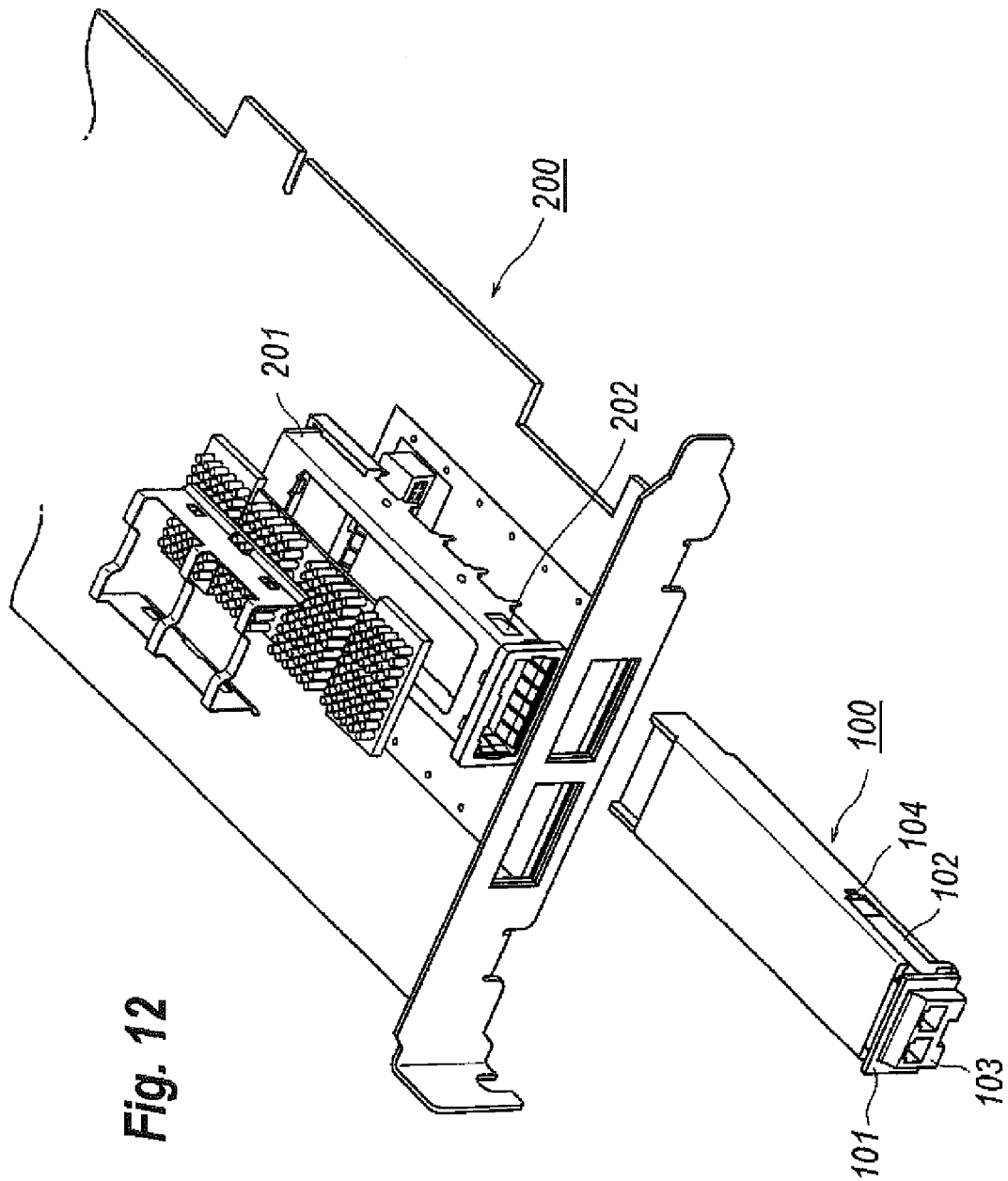
FIG. 12 is a perspective view of an optical transceiver without a pull-tab, where the optical transceiver is to be set within the cage.

FIG. 10 shows an optical transceiver 1 set in the cage 201A in the upside-down arrangement, namely, the handle 6 extends from the lower side of the optical receptacle 41 and the optical fiber 11 rides on the supporting surface 64 in the bar 62. FIG. 10 omits another optical transceiver set in the cage 201A above the one shown in FIG. 10, where two optical transceivers are set in the cage 201 in the belly to belly arrangement. FIG. 11A is a side view when the optical transceiver 1 in the upside-down arrangement receives an optical connector 12 in the optical receptacle 41; while, FIG. 11B to shows a cross section of a portion of the supporting surface 64 where the optical fiber 11 rides thereon. The optical connector 12 extends a boot 13 with a preset length to protect the optical fiber set therein. The optical fiber 11 extending from the boot 13 comes in contact to the supporting surface 64 at least two points, then droops downwardly at the edge of the supporting surface 64.

In order to manipulate the handle 6 to insert/extract the optical transceiver 1, the handle 6 is preferably to protrude from the end of the boot 13. Even when such an arrangement of the handle 6, exactly, the bar 62, does not interfere with the optical fiber 11 when the optical transceiver 1 is set in the cage 201A by the normal posture, because the optical fiber 11 naturally droops at the end of the boot 13. On the other hand, when the optical transceiver 1 is set in the cage 201A by the upside-down arrangement, the bar 62 could interfere with the extension of the optical fiber 11. Some countermeasures against the minimum bending radius may be necessary.

Referring to FIG. 11B, the bar 62 of the present embodiment has a feature that the end point 'a' of the boot 13, the end points, 'b' and 'c', of the supporting surface 64 form an arch with a radii of the curvature thereof greater than 30 mm. The optical fiber 11 pulled out from the optical connector 12 droops at the end point 'a' of the boot 13 by the radius of 30 mm. That is, the extensions 61 of the handle 6 has a length with respect to the dimensions of the optical connector 12, in particular, to the end of the boot 13, such that the end 'a' of the boot 13 and two points, 'b' and 'c' of the supporting surface 64 are on the arch with the radius of 30 mm or larger.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An optical transceiver to be inserted in a cage prepared in a host system, the cage providing a stopper to prevent the optical transceiver from sliding out therefrom, the optical transceiver comprising:
   a housing configured to enclose an optical component and an electrical component therein;
   an optical receptacle that receives an external optical connector therein; and
   a pull-tab including a handle having a pair of extensions and a bar connecting the extensions, the bar including a supporting slope that supports an optical fiber extending from the optical connector set in the optical receptacle,
   wherein the optical fiber is secured with a boot from an end of the external optical connector, and
   wherein the boot in an end thereof, the supporting slope in an end closest to the optical transceiver, and another end of the supporting slope farthest from the optical transceiver virtually form an arch with a radius of curvature greater than 30 mm.

2. The optical transceiver of claim 1,
   wherein the supporting slope supports the optical fiber when the optical transceiver is set in the cage by an upside-down arrangement.

3. The optical transceiver of claim 1,
   wherein the bar further provides walls in respective sides thereof, the walls and supporting slope forming a hollow that secures the optical fiber therein.

4. The optical transceiver of claim 1,
   wherein the bar provides a front end thereof formed in an arched shape.

\* \* \* \* \*